May 15, 1956 N. A. NELSON 2,745,330
FLEXIBLE IMPLEMENT CONNECTION TO TRACTOR DRAWBAR
Filed June 1, 1950 3 Sheets-Sheet 1

INVENTOR.
NORAL A. NELSON
BY
ATTORNEYS

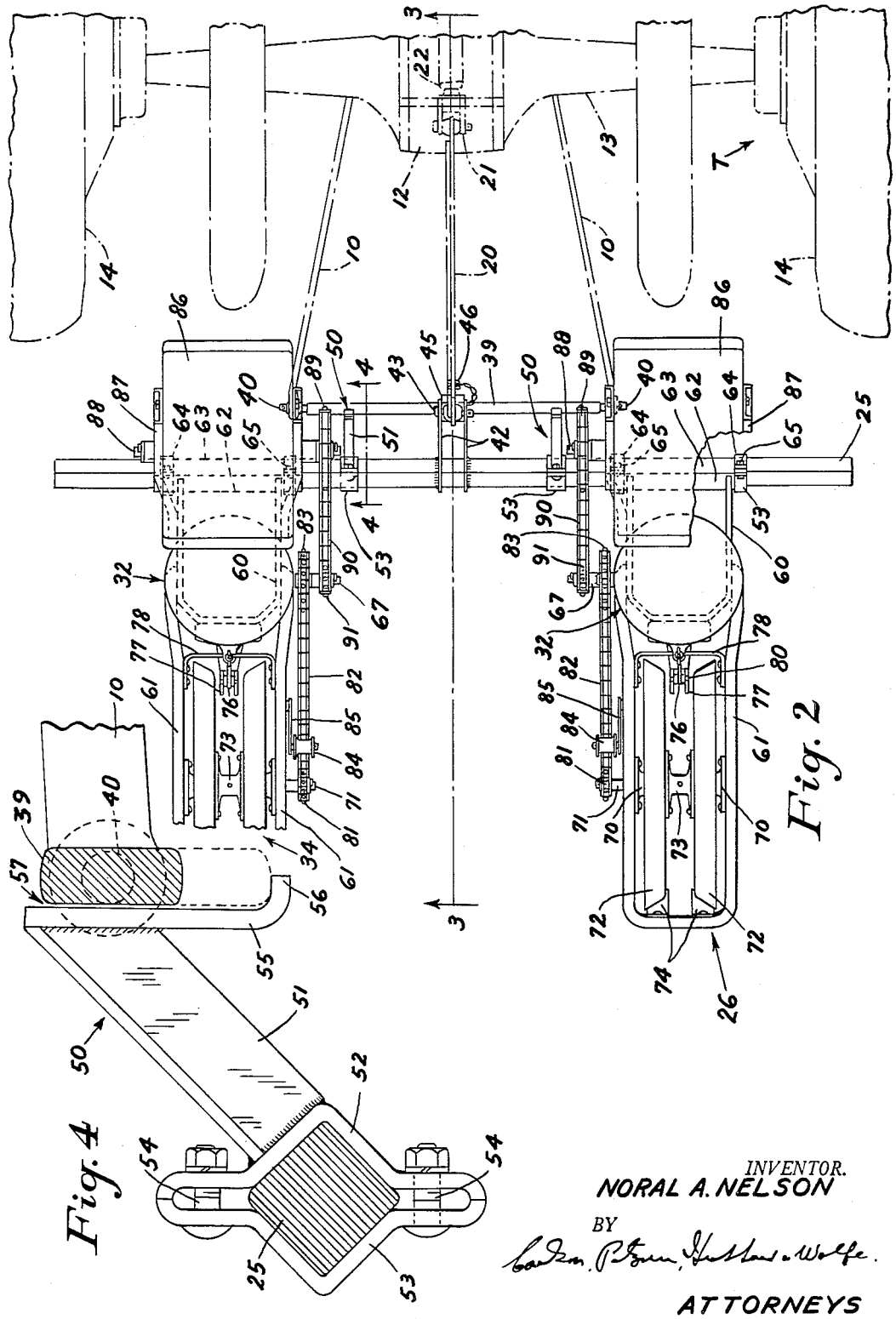

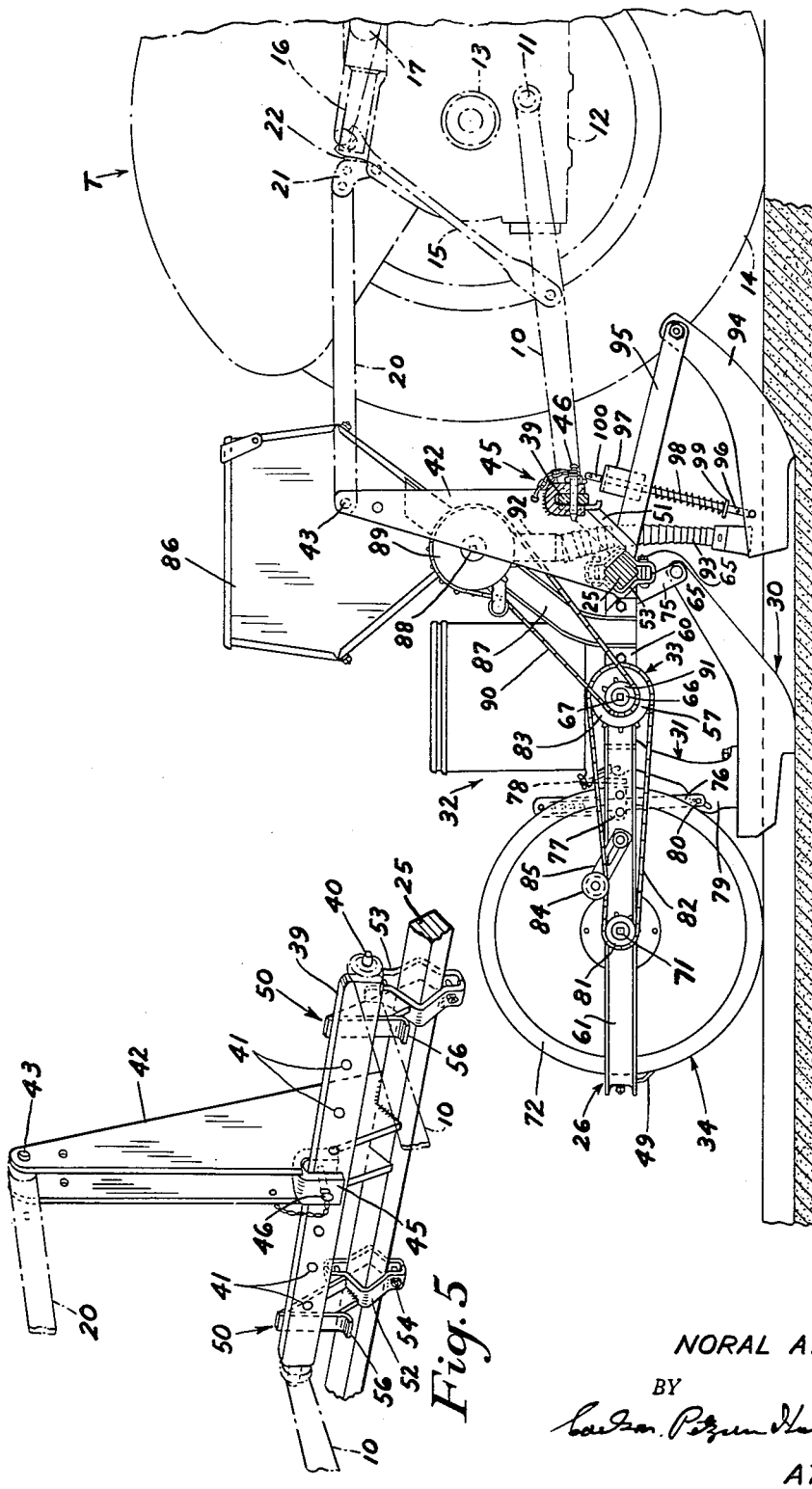

United States Patent Office 2,745,330
Patented May 15, 1956

2,745,330

FLEXIBLE IMPLEMENT CONNECTION TO TRACTOR DRAWBAR

Noral A. Nelson, Detroit, Mich., assignor to Harry Ferguson, Inc., Detroit, Mich., a corporation of Delaware Application June 1, 1950, Serial No. 165,489

4 Claims. (Cl. 97—47.62)

The invention relates to multiple row planters and more particularly to planters adapted for use with a tractor of the type equipped with a power-operated hitch linkage by which an attached implement may be swung between a lowered or working position and a raised or transport position.

One object of the invention is to simplify the construction of planters of the above general character to the end that they may be produced at lower cost and maintained more easily while retaining all the flexibility necessary to insure uniform planting depth in each of a plurality of rows.

A more specific object is to provide a multiple row planter in which the seeding units are supported on a simple rigid frame structure adapted to be connected with the draft linkage of the tractor in a novel manner which affords the flexibility for insuring uniform planting depth in each row, thus eliminating the conventional articulated mountings for the seeding units and correspondingly simplifying the over-all construction of the planter, improving its ruggedness and dependability, and materially reducing its initial cost.

The invention also resides in various structural improvements and novel combinations of elements by means of which simplicity of structure and low cost manufacture are correlated with ruggedness and precision in operation.

Other objects and advantages of the invention will become apparent from the following detailed description of the preferred embodiment illustrated in the accompanying drawings, in which:

Fig. 2 is a plan view of the planter.

Fig. 3 is a longitudinal sectional view of the planter taken in a plane substantially on the line 3—3 of Fig. 2.

Fig. 4 is an enlarged fragmentary sectional view taken in a plane substantially on the line 4—4 of Fig. 2.

Fig. 5 is a perspective view showing structural details of the mechanism for coupling the planter to the hitch linkage of the tractor.

Figure 1:
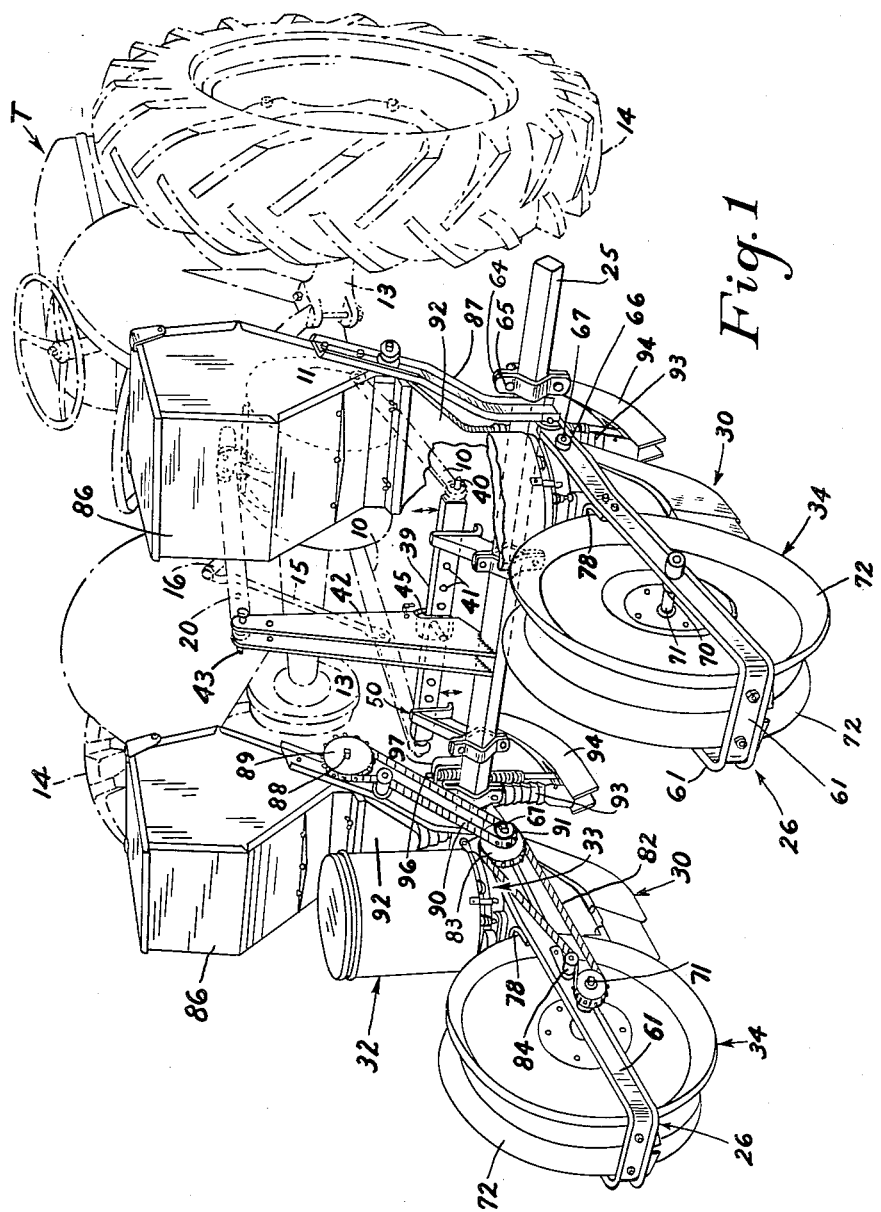
Figure 1 is a rear perspective view of a planter embodying the features of the invention, the planter being shown coupled with a lightweight agricultural tractor.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The improved planter is intended primarily for use with a tractor equipped with a power-operated hitch linkage by which an attached implement may be bodily raised or lowered to adjust its working depth and which is also operable to swing the implement between working and transport positions. A tractor T so equipped has been shown in Figs. 1.–3 by way of illustration. This tractor is a lightweight agricultural tractor equipped with a power-operated hitch linkage of the type disclosed in the Ferguson Patent No. 2,118,180 issued May 24, 1938, to which reference may be had as to details of construction and mode of operation.

For present purposes it is sufficient to note that the tractor has a hitch linkage including a pair of spaced lower draft links 10 trailingly pivoted as at 11 for universal swinging movement on the rear portion of its center housing 12. These pivot points are located below and somewhat forwardly of the rear axle 13 upon which the tractor drive wheels are mounted. The lower links 10 are supported by drop links 15 (Figs. 1 and 3) from crank arms 16 carried at opposite ends of a rockshaft 17 journaled on the housing 12 and adapted to be rocked by a hydraulic power unit (not shown) enclosed within the housing. By suitable actuation of the power unit the implement may be swung from the ground-engaging or working position in which it is shown in Figs. 1 and 3 to a raised or transport position clear of the ground.

Also forming a part of the hitch linkage is an upper or control link 20 universally pivoted at its forward end to a shackle 21 pivoted on the upper rear portion of the tractor housing 12. The shackle in turn is operatively connected with a spring-loaded plunger 22 which constitutes a part of the automatic control for the hydraulic power unit as described in the aforementioned Ferguson patent.

The improved planter is characterized by its extreme simplicity, which has been attained, however, without sacrificing flexibility either in regard to its ability to follow changing ground contour or its adjustability for different row spacings. By reference to Figs. 1 and 2 it will be observed that the planter has a rigid frame structure which comprises a transverse tool bar 25 upon which are mounted a plurality of subframes 26, one for each row the planter is equipped to handle. Each subframe carries the elements of a complete seeding unit including a furrow opener 30, seed boot 31, seed hopper 32, rotary seed dispensing mechanism 33 and a press wheel 34.

To enable the rigidly supported seeding units to plant at uniform depths in each row despite changes in ground contour, novel means is provided for coupling the planter with the tractor hitch linkage, which affords a substantial degree of flexibility between the implement and the tractor. More particularly, the coupling is arranged so that the supporting frame structure of the planter may rock bodily about a horizontally disposed fore and aft axis, or in other words, an axis extending longitudinally of the tractor. The coupling also permits the implement frame to swivel about a vertical axis. Provision is made, of course, for restraining such movements within predetermined limits so that the planter is always maintained in proper operating relation with respect to the tractor and is likewise prevented from excessive tilting or swinging when raised to transport position.

The coupling means in its preferred form is adapted to operate with a drawbar 39 which may be associated more or less permanently with the tractor hitch linkage. The drawbar as shown has connecting pins 40 (Figs. 2 and 5) at opposite ends engaging in the usual ball and socket elements provided on the trailing ends of the lower links 10 of the tractor hitch. It also has a series of holes 41 uniformly spaced apart along the bar.

Projecting upwardly substantially centrally of the tool bar 25 is a rigid member or strut adapted for connection at vertically spaced points with the drawbar 39 and with the upper hitch link 20. The strut is formed, in this instance, by a pair of generally triangular steel plates 42 welded to the tool bar at their lower ends. These plates are spaced apart longitudinally of the tool bar to receive between them the rear end portion of the upper hitch link 20 which is operatively connected to the plates adjacent their upper ends by suitable releasable connecting means such as a pin 43.

Preferably, the strut plates 42 are attached to the tool bar so that their forward edges extend substantially beyond the bar, as shown in Figs. 3 and 5. The plates 42 are notched at their lower ends for the reception of a coupling element 45 adapted to be connected with the drawbar 39 for pivotal movement. This coupling element preferably comprises a hook or U-shaped yoke and is secured as by welding to the strut plates in inverted position for engaging over the drawbar 39. A pin 46 inserted through alined holes in the yoke and a selected one of the holes 41 in the drawbar secures the parts together for relative rocking or pivotal movement about a horizontal fore and aft axis.

It will be evident that the pivotal connection between the planter frame structure and the drawbar 39 allows the planter to adjust itself to changes in ground contour and thus maintain both seeding units at a uniform working depth. It is also desirable to provide clearance between the legs of the yoke 45 and the drawbar 39 and to fit the pin 46 loosely in the drawbar so that the planter may swivel to some extent about a vertical axis. This enables the planter to follow the tractor closely and reduces lateral strains on the planter and coupling elements.

Provision is made for restraining the relative rocking movements of the planter frame structure and the drawbar 39 within predetermined limits when the planter is in operation and to prevent excessive tilting or swinging of the planter when raised to transport position. The restraining means preferably comprises a pair of stops 50 mounted on the tool bar 25 and positioned for engagement by the drawbar 39. The stops 50, as shown in Figs. 3–5, are alike, each comprising an upwardly and forwardly directed arm 51 having at its lower end an angularly bent strap 52 adapted to cooperate with a complemental strap 53 for rigidly clamping the stop to the tool bar. The clamping straps 52 and 53 may be secured together as by bolts 54, permitting quick and easy removal or adjustment of the stops.

At its forward end each of the arms 51 is fitted with a stop element in the form of a bar having an upright portion 55 and a forwardly projecting lower end portion or foot 56. In practice the upright portion of the stop element is spaced from the rear face of the drawbar 39, as indicated at 57 in Fig. 4, to allow for the swiveling of the planter frame relative to the drawbar about a vertical axis. The foot portion 56 of the stop element is arranged to project below the drawbar and is spaced therefrom so as to prevent relative rocking movement between the planter frame structure and the drawbar beyond the limit position in which the drawbar is shown in broken lines in Fig. 4. When the planter and tractor are in their normal level positions, the drawbar 39 is disposed in the position in which it is shown in full lines in Fig. 4.

As to specific structural details of the improved planter, it will be appreciated that various changes in the form of the parts and the manner in which they are connected may be made without sacrificing the advantages afforded by the novel arrangement for coupling the implement to the tractor hitch linkage. The construction herein disclosed is preferred by reason of its simplicity, low cost and dependability.

In general, the elements of the seeding unit, including the furrow opener 30, the seed boot 31, the seed hopper 32 and the seed dispensing mechanism 33, may be of conventional construction. The subframe 26 upon which each seeding unit is supported preferably comprises two parts, namely, a front frame member 60 upon which the above mentioned elements of the seeding unit are carried and a rear frame member 61 supporting the press wheel 34. These frame members may be formed from channel bars or other suitable stock. Each member is of generally U-shaped form and the two members are assembled in forwardly facing tandem relation with the front frame member rigidly attached to the tool bar 25 and the rear frame member pivotally attached to the front frame member.

The front frame member 60, which carries the seed hopper 32 and associated parts of the seeder, is provided at its forward end with suitable clamping means for rigidly securing it to the tool bar 25. The clamping means as shown in Fig. 2 comprises a pair of opposed clamping members 62 and 63, in this instance simple angle bars adapted to fit tightly around the tool bar 25. One of the clamping members, in this case the member 62, is arranged transversely of the frame member 60 and is welded or otherwise permanently attached to the legs thereof. Both clamping members are provided with cross straps 64 having their abutting ends apertured for the reception of bolts 65 by which the members are clamped to the tool bar.

The rear frame member 61 is arranged with its legs straddling the rear portion of the front frame member 60 and pivotally engaging a pair of studs 66 projecting laterally from the legs of the front frame member. These studs additionally constitute bearings for a cross shaft 67 which drives the seed dispensing mechanism 33, as will appear presently.

The rear frame member 61 in addition to supporting the press wheel 34, as above mentioned, cooperates with the front frame member in supporting the furrow opener 130 and seed boot 31 in a manner which enables the press wheel to gauge the depth of the furrow. For supporting the press wheel the legs of the member are fitted with bearings 70 (Fig. 2) journaling a shaft 71 upon which the press wheel is non-rotatably fixed. As shown in Figs. 1 and 2, the press wheel in its preferred form comprises a pair of sheet metal discs 72 having peripheral flanges of frusto-conical shape suitable for pressing the dirt back into the furrow made by the furrow opener 30. The discs are secured coaxially to opposite ends of an elongated hub 73 pinned or otherwise secured to the shaft 71. Suitable scraper elements 74 are provided on the frame member for removing any dirt that sticks to the wheel flanges.

The furrow opener 30, herein shown as comprising a curved double edged runner, is assembled as a unit with the seed boot 31, the latter being bolted to the runner adjacent its rear end. The runner is pivotally supported at its forward end from the front frame member 60 and the runner and boot assembly are additionally supported for vertical adjustment from the rear frame member 61. In the exemplary embodiment the support for the forward end of the runner is provided by a depending bracket 75 (Fig. 3) which may be secured to the front frame member in any preferred manner, as by welding to the fixed clamping member 62.

Support for the rear end of the runner and boot assembly is provided by a link 76 slidably received in a slot formed by a U-shaped guide fitting 77 extending rearwardly from a cross brace 78 connected between the legs of the rear frame member. A pin extending through alined holes in the fitting 77 is engageable selectively in any one of a series of longitudinally spaced holes in the link to determine the spacing of the furrow opener with respect to the flanges of the press wheel.

The lower end of the link 76, which is preferably bifurcated, is arranged to straddle a lug 79 formed on the seed boot 31 and is secured thereto by a pin 80 engaging in a generally upright slot in the lug. This pin and slot connection allows the furrow opener to shift vertically to compensate for minor irregularities in the surface of the soil. As explained above, however, the spacing of the furrow opener with respect to the press wheel to determine the depth of the furrow formed thereby is regulated by adjusting the link 76 with respect to the guide fitting.

When the planter is used for drilling as distinguished from check row planting, the press wheel 34 is utilized to drive the seed dispensing mechanism 33. For this purpose the press wheel shaft 71 is fitted with a sprocket wheel 81 connected by a drive chain 82 with a sprocket wheel 83 fast on the seed dispenser shaft 67. A roller 84 carried by an arm 85 adjustably mounted on the adjacent leg of the rear frame member 61 is arranged to press on the chain to maintain proper tension. Since the pivotal axis of the rear frame member 61 is coincident with the axis of the shaft 67, the press wheel and its supporting structure may swing freely without disturbing the adjustment of the chain.

The exemplary planter has been shown as equipped with fertilizer distributing attachments which can, of course, be omitted without affecting the operation of the seeding units above described. The attachments, one of which is provided for each seeding unit, each comprise a hopper 86 supported in elevated position by a bracket 87 bolted or otherwise removably attached to one leg of the front frame member 60. The hopper is provided at its lower end with suitable rotary dispensing mechanism having a driving shaft which may be driven in common with the associated seeding unit by the press wheel of that unit. To this end the shaft 88 is fitted with a sprocket wheel 89 drivingly connected by a chain 90 with a sprocket wheel 91 fast on the seed dispensing shaft 67.

The dispensing mechanism may be of any preferred type arranged to drop measured amounts of fertilizer into a boot 92 which opens at its lower end into a flexible tube 93 secured at its lower end to the rear end portion of a curved runner 94. This runner is positioned so as to form a shallow furrow for the reception of the fertilizer, such furrow preferably being located at one side of the furrow opened by the furrow opener 30 for the seeding unit. Runner 94 as shown is pivotally supported at its forward end on a bracket 95 extending forwardly and downwardly from the tool bar and rigidly clamped thereto for easy removal or adjustment. The runner 94 is retained in fore and aft alignment by a guide rod 96 pivotally attached to the runner adjacent its rear end and projecting through an aperture in a guide 97 carried by the bracket 95. A spring 98 interposed between a collar 99 on the rod and the guide 97 urges the rear end portion of the runner downwardly to maintain it in ground engaging position. A head 100 formed on the upper end of the guide rod cooperates with the guide 97 to determine the limit position of the runner.

It will be apparent from the foregoing that the invention provides a planter of extremely simple construction, yet capable of planting at uniform depth in each of a plurality of rows. By reason of its simplicity the planter is inexpensive to manufacture and easy to maintain in proper operating condition. The rigid character of the frame together with its lightweight and close coupling with the tractor facilitates its positioning by the power lift of the tractor either for transport or to maintain selected planting depths in operation.

I claim:

1. The combination with a tractor having a power operated hitch linkage including a pair of trailingly pivoted laterally spaced draft links and a trailing pivoted upper link with a drawbar connected between the draft links, of an implement comprising a rigid frame structure including an elongated transversely disposed tool bar, means rigid with said tool bar connecting said frame structure to the drawbar for free pivotal movement about a fore-and-aft axis and for limited pivotal movement about a vertical axis, said means having an upwardly projecting extension for connecting said frame structure with the upper link at a point spaced substantially above the drawbar, and means on said tool bar comprising a pair of stops each including a forwardly facing arm terminating at its lower end in an angularly bent strap positioned to coact with the drawbar to restrict both such pivotal movements within predetermined limits.

2. The combination with a tractor having a power operated hitch linkage including a pair of trailingly pivoted laterally spaced draft links and a trailing pivoted upper link with a drawbar connected between the draft links, of an implement comprising a rigid frame structure including an elongated transversely disposed tool bar, an upright strut rigid with said tool bar, said strut having at its lower end a hook-shaped yoke engaged over the drawbar and having its upper end connected to the upper link, said yoke and said drawbar being apertured for the reception of a pivot pin connecting the parts for relative rocking movement about an axis disposed longitudinally of the tractor, and members mounted on said tool bar coacting with the drawbar to restrict the rocking movements of the parts within predetermined limits.

3. The combination with a tractor having a power operated hitch linkage including a pair of trailingly pivoted laterally spaced draft links and a trailingly pivoted upper link with a drawbar connected between the draft links, of an implement comprising a rigid frame structure including an elongated transversely disposed tool bar, an upright strut rigid with said tool bar, said strut having at its lower end a hook-shaped yoke engaged over the drawbar and having at its upper end connected to the upper link, said yoke and the drawbar being apertured for the reception of a pivot pin connecting the parts for relative rocking movement about an axis disposed longitudinally of the tractor, said pin having substantial clearance in said apertures to permit relative rocking of the frame and drawbar about a generally vertical axis, and stop members on said tool bar cooperating with the drawbar to limit the relative rocking movements of the frame and drawbar about both of said axes.

4. The combination with a tractor having a power operated hitch linkage incoluding a pair of trailingly pivoted laterally spaced draft links and a trailingly pivoted upper link with a drawbar connected between the draft links, of an implement comprising a rigid frame structure including an elongated transversely disposed tool bar, a pair of generally triangular steel plates disposed in parallel relation and rigidly secured to the tool bar at their lower ends so as to project upwarrly from the bar and present a forward edge portion substantially ahead of the bar, said plates being spaced apart longitudinally of the bar to receive between them the rear end portion of the upper link and having means adjacent their upper ends connected with that link, a generally U-shaped yoke secured to the forwardly extending portions of said plates in inverted position to define a transverse channel for the reception of the drawbar, said yoke and the drawbar being apertured for the reception of a pin positioned to define a pivotal axis for the frame extending longitudinally of the tractor, a pin removably inserted through said apertures to connect the frame to the drawbar, said pin having substantial clearance in said apertures to permit relative rocking of the frame and drawbar about a generally vertical axis, a pair of rigid arms projecting forwardly and upwardly from said tool bar adjacent opposite ends of the drawbar, each of said arms carrying at its forward end a stop element presenting forwardly and upwardly facing portions engageable with the drawbar to define the limit positions of the bars in their pivoting about both vertical and fore-and-aft axes.

References Cited in the file of this patent

UNITED STATES PATENTS

| | | |
|---|---|---|
| 455,470 | Brown | July 7, 1891 |
| 627,520 | Packham | June 27, 1899 |
| 731,658 | Barry | June 23, 1903 |
| 1,529,425 | Ferguson | Mar. 10, 1925 |
| 1,556,508 | Hentzell et al. | Oct. 6, 1925 |
| 1,626,012 | Reuse | Apr. 26, 1927 |
| 1,729,535 | Brown | Sept. 24, 1929 |
| 1,899,931 | Benjamin et al. | Mar. 7, 1933 |
| 2,253,706 | Hipple | Aug. 26, 1941 |

(Other references on following page)

UNITED STATES PATENTS

| | | |
|---|---|---|
| 2,328,174 | Silver | Aug. 31, 1943 |
| 2,347,898 | Ferguson | May 2, 1944 |
| 2,351,511 | Hipple et al. | June 13, 1944 |
| 2,510,179 | Johnson | June 6, 1950 |
| 2,554,061 | Sandberg | May 22, 1951 |
| 2,569,389 | Seaholm | Sept. 25, 1951 |
| 2,590,385 | Devereaux | Mar. 25, 1952 |
| 2,618,211 | Fraga | Nov. 18, 1952 |
| 2,649,722 | Raught | Aug. 25, 1953 |
| 2,685,242 | Rusco | Aug. 3, 1954 |